United States Patent [19]

Chung et al.

[11] Patent Number: 5,209,883
[45] Date of Patent: May 11, 1993

[54] FABRICATION OF FLUOROPOLYMER HOLLOW FIBERS FOR ASYMMETRIC MEMBRANES

[75] Inventors: Tai-Shung Chung, Randolph; Edward R. Kafchinski, Winfield; Paul Foley, Oldwick, all of N.J.

[73] Assignee: Hoechst Celanese Corp., Somerville, N.J.

[21] Appl. No.: 686,739

[22] Filed: Apr. 17, 1991

[51] Int. Cl.[5] ............................................. D01D 5/247
[52] U.S. Cl. ...................... 264/41; 264/129; 264/184; 264/205; 264/209.1; 264/211.16; 264/558; 427/245
[58] Field of Search .................... 264/41, 209.1, 558, 264/211.16, 203, 129, 184, 205; 427/245; 210/500.23, 500.27, 500.39; 55/16, 68, 158

[56] References Cited

U.S. PATENT DOCUMENTS

| | | | |
|---|---|---|---|
| 4,230,463 | 10/1980 | Henis et al. | 264/41 |
| 4,629,563 | 12/1986 | Wradsidlo | 210/500.38 |
| 4,664,669 | 5/1987 | Ohyabu et al. | 55/158 |
| 4,871,494 | 10/1989 | Kesting et al. | 264/41 |
| 4,881,954 | 11/1989 | Bikson et al. | 55/158 |
| 5,074,891 | 12/1991 | Kohn et al. | 55/158 |

*Primary Examiner*—Leo B. Tentoni
*Attorney, Agent, or Firm*—Joseph M. Mazzarese

[57] ABSTRACT

Asymmetric hollow fibers comprising a fluoropolymer, and a process for making such fibers. The hollow fibers are useful for making fluid separation membranes, especially gas separation membranes. In one embodiment of the process of this invention, a polymer dope having a viscosity of about 3000 poise or greater is prepared by solvating the polymer in a solvent system containing about 40%-90% N-methyl-2-pyrrolidone and about 60%-10% propionic acid by weight. The dope is dry-jet wet-spun into hollow fibers using a water-NMP core solvent. The fibers are coagulated in methanol. The fibers are then coated with a highly permeable material.

13 Claims, 1 Drawing Sheet

FABRICATION OF FLUOROPOLYMER HOLLOW FIBERS FOR ASYMMETRIC MEMBRANES

BACKGROUND OF THE INVENTION

This invention relates to the field of hollow fiber production, especially to hollow fibers for use in asymmetric fluid separation membranes.

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness and reduces wear and tear.

Highly porous membranes tend to be very permeable, but do a poor job of separating fluids into their components. Less porous, dense membranes can be more selective, but at the cost of reduced throughput.

Asymmetric membranes generally have a thin, dense separation layer and a less dense, more permeable layer. These asymmetric membranes are often chosen for separation applications because they may provide a good combination of permeation and separation. Hollow fibers having a dense skin and a porous body can be used to make such membranes.

U.S. Pat. No. 4,230,463 issued to Henis, et al. describes multi-component membranes for gas separations wherein a porous membrane is coated with another substance. The coating is said to enhance the separation capability of the membrane.

U.S. Pat. No. 4,871,494 issued to Kesting, et al. describes a process for forming asymmetric gas separation membranes having graded density skins. This process comprises dissolving a hydrophobic polymer in a Lewis acid:base solvent system wherein the Hildebrand parameters of the solvent species and the polymer are within less than 1.5, creating a dope from this solution, forming the dope into an appropriate shape, coagulating the dope, desolvating, washing and drying. According to the patent, the resultant membrane has increased free volume as evidenced by a glass transition temperature greater than the bulk glass transition temperature of the polymer.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

SUMMARY OF THE INVENTION

The present invention comprises asymmetric hollow fibers made from a fluoropolymer, and a process for making such fibers. These fibers are useful for making separation membranes, especially membranes having a separation factor that exceeds 4 for oxygen and nitrogen.

In the process of this invention, a polymer dope having a viscosity of about 3000 poise or greater is prepared by solvating the fluoropolymer in a solvent system containing N-methyl-2-pyrrolidone ("NMP") and another solvent or a nonsolvent, e.g. propionic acid ("PA"), where the NMP:PA ratio is approximately between 90:10 and 40:60. The dope is dry-jet wet-spun into hollow fibers using a core solvent that will not coagulate the polymer too quickly, for example, water:NMP in the approximate ratio of between 100:0 and 20:80; the fibers are coagulated in methanol. The fibers are then coated with a highly permeable substance, e.g. a silicone composition; the coating is preferably about 3-8 microns thick.

An object of the present invention is to provide a process for making a hollow fiber suitable for use in gas separation membranes.

Another object of the present invention is to provide a novel asymmetric hollow fiber comprising a fluoropolymer.

A further object of the present invention is to provide a fiber that may be used to separate oxygen from nitrogen, and a method for making same.

Other objects of the present invention will be apparent to those skilled in the art from the following description, drawings, and claims.

DETAILED DESCRIPTION OF THE PREFERRED EMBODIMENTS

Figure 1A:
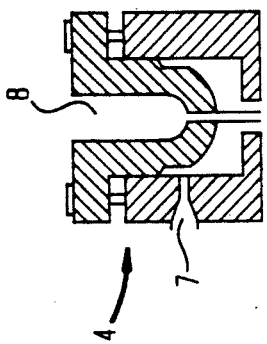
FIG. 1A is an enlarged cutaway side elevation view of the die shown in FIG. 1.
Figure 1:
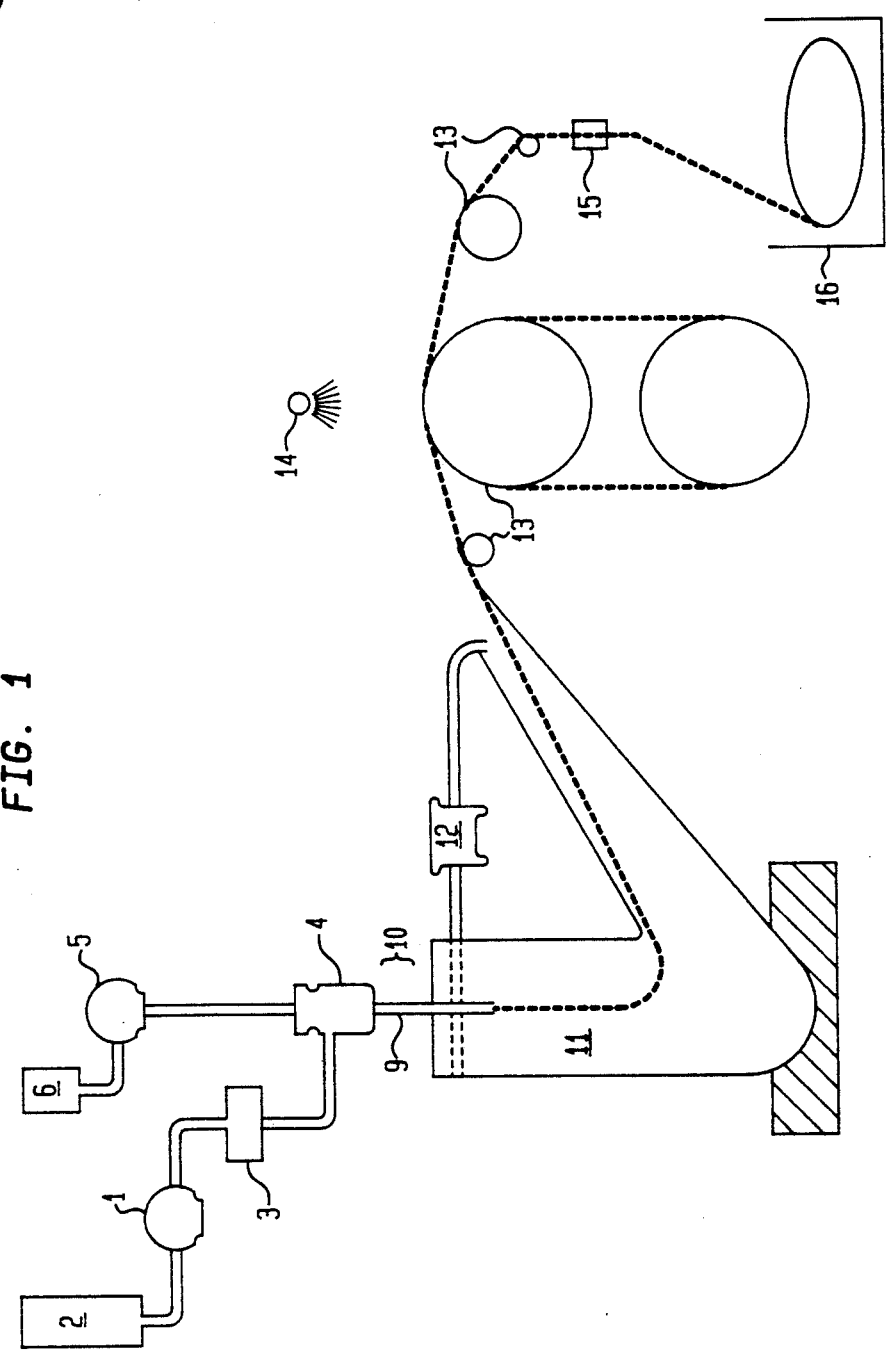
FIG. 1 illustrates one embodiment of an apparatus and a process for making a hollow fiber according to the present invention.

FIGS. 1 and 1A illustrate one embodiment of a process for making hollow fibers according to the present invention. A first pump 1 draws the polymer dope from a dope reservoir 2 through a filter 3 into a die 4. At the same time, a second pump 5 draws core solvent from a solvent reservoir 6 and into the die 4. The dope enters the die 4 through an inlet 7 on the side thereof and the core solvent enters through an opening 8 at the top thereof. As the polymer dope and core solvent exit the die 4 a hollow fiber 9 is formed.

The hollow fiber 9 passes through an air gap 10 before entering a coagulation bath 11 in which the temperature is maintained at a desired level by a temperature controller 12. When the fiber 9 leaves the bath 11, guide rollers 13 lead the hollow fiber 9 past a water spray 14 and then to a fiber take-up device 15 and collector 16.

The polymer dope is made by dissolving a fluoropolymer, e.g. SIXEF-33 TM (a polyimide made by the Hoechst Celanese Corporation from 2,2-bis[3-aminophenyl]hexafluoropropane and 2,2-bis[3,4-dicarboxyphenyl]hexafluoropropane dianhydride), in a solvent composition containing the solvent NMP and a second liquid such as propionic acid, wherein the NMP:PA ratio is from about 90:10 to about 40:60. In one preferred embodiment of this invention a 57:43 weight ratio is used, i.e., equimolar amounts of NMP and PA.

Other fluoropolymers may be used in the practice of the present invention, provided that the polymer has a dielectric constant less than or equal to about 3.0. For example, SIXEF-44 TM, a polyimide made by the Hoechst Celanese Corporation from 2,2-bis[4-aminophenyl]hexafluoropropane and 2,2-bis[3,4-dicarboxyphenyl]hexafluoropropane dianhydride may be substituted for SIXEF-33 TM. The fluoropolymer is preferably partially or wholly aromatic, although aliphatic fluoropolymers may be employed.

Other liquids miscible with NMP may be substituted for propionic acid, including acetic acid, butyric acid, and the like.

The polymer content of the dope is sufficient to produce a dope viscosity at 25° C. of at least about 3000 poise, preferably at least about 4000 poise. An undesirably low viscosity will have a detrimental effect on hollow fiber formation. Of particular importance is achieving a sufficient viscosity such that the molecular weight of the polymer molecules is high enough to cause significant chain entanglements; these entanglements are important in achieving a good separation factor. A polymer concentration of about 13%–50% by weight or more in the dope may be needed to achieve a desirable viscosity; preferably the polymer concentration is at least about 30%–50%. However, the percentage needed may be more or less, depending on the fluoropolymer and the ratio of NMP to the second solvent or nonsolvent.

The die temperature is typically between about 25° C. and about 100° C., but the optimum temperature depends upon the polymer being spun; those skilled in the art will be able to determine the optimum temperature for a given system. The air gap is generally about 1–10 inches, preferably between about 5 inches and 10 inches. As the fiber passes therethrough, some solvent evaporation occurs and the outer surface of the fiber begins to coagulate slowly; this event is critical to the formation of an asymmetric fiber having a thin, dense outer layer. The air gap should be optimized to produce the best asymmetric fiber; the optimal gap will depend upon many factors, including the polymer used, the solvent system, the rate of spinning, and the die temperature.

Water may be used for the core solvent, although a mixture of NMP and water is preferred. The inner surface will coagulate more quickly when a higher percentage of water is used. Generally, the core solvent is an NMP-water mixture from about 20% to 100% water by weight. In one preferred embodiment the NMP:water ratio is 80:20. Other core solvents may be used provided they do not coagulate the polymer too rapidly, e.g., acetic acid, propionic acid, glycerine, and the like.

When the fiber hits the methanol bath, which is suitably maintained at a temperature of about 25° C., the fiber coagulates quickly. Solvent remaining after the fiber leaves the bath may be washed away by a water spray or other washing method known in the art. Conventional means are then used to collect the hollow fiber.

One goal of the process of the present invention is to provide a very thin, dense outer layer on the fiber. This layer is essential to provide an asymmetric fiber that is useful in fluid separations. If this layer is too thick, however, the fiber will not have sufficient permeability. Preferably, the thickness of the dense layer will be less than about 1 micron, more preferably between 0.05 and 0.3 micron.

After the fiber has been made, it must be coated with a highly permeable material to seal the fiber surface. Without such a coating, the fiber will not have the desired high separation factor. Suitably a coating about 1–8 microns thick or more is applied, preferably about 3–8 microns thick.

The present invention is not limited to a particular coating material; any nonreactive, stable, highly permeable substance that can be coated on the fiber will enhance the separation factor of the fiber. For the purpose of this invention, a highly permeable substance is one having a permeability of at least about 10 barres. An example of a suitable coating material is a silicone composition such as Sylgard ™ 184 (Dow Chemical Corp.), which may be dissolved in petroleum ether (b.p. 35°–60° C.) for application to the fiber. Coating is accomplished by any suitable conventional means.

The fibers of the present invention are particularly suitable for use in membranes for separating oxygen from nitrogen. Suitably, the fibers will have a separation factor for these gases of at least about 4–5, preferably about 6 or higher, and most preferably about 7 or more. The separation factor of the fiber is defined as the ratio of the permeability of oxygen to the permeability of nitrogen. The hollow fibers of the present invention typically have a significantly lower glass transition temperature than does the bulk fluoropolymer.

The following Examples illustrate several embodiments of the present invention. However, the invention should not be construed as limited to the embodiments illustrated.

EXAMPLE I

Table 1 shows how differences in solvent and coagulant affect the characteristics of fibers made from SIXEF-33 ™, thus providing evidence of the importance of several elements of the present invention. The oxygen permeances and separation factors are for uncoated fibers. The NMP/PA solvent ratio was 57/43.

As the table illustrates, the highest permeances were for those fibers having the thinnest dense layer, i.e., the fibers made using an NMP/PA solvent according to the present invention. NMP alone was the next best solvent. It is further evident from the tabulated data that a thinner dense layer is created when methanol is used as a coagulant instead of water.

TABLE 1

A Comparison of SIXEF-33 ™ Fiber Performance

| Solvent | Coagulant | $O_2$ permeance | $\alpha$ | Dense Layer ($\mu$) |
|---|---|---|---|---|
| NMP | MeOH | 2.63 | 3.52 | 0.6 |
| DMAC | $H_2O$ | 0.51 | >7 | 2.97 |
| NMP/PA | $H_2O$ | 3.97 | 4.0 | 0.4 |
| NMP/PA | MeOH | 19.2 | 3.2 | 0.09 |
| dioxane/acetone | $H_2O$ | 0.19 | 6.4 | 7.9 |
| dioxane/acetone | MeOH | 1.92 | 5.2 | 0.79 |

$\alpha$ = separation factor: $O_2$ permeability/$N_2$ permeability
Permeance unit: $10^{-6}$ cc (STP)/sec cm2 cm Hg
DMAC = dimethyl acetamide

EXAMPLE II

Table 2 shows how sensitive is dope viscosity to changes in polymer content. The viscosity of two SIXEF-33 ™ /NMP/PA dopes were measured at several temperatures. In both cases the ratio of NMP:PA was 57:43. A mere 1% change in polymer content made a drastic change in viscosity. This viscosity difference is reflected in a significant difference in the separation factor of fibers made from these dopes; the 41% SIXEF-33 ™ dope produces a fiber that has much poorer performance than does the 42% SIXEF-33 ™ dope.

TABLE 2

Viscosity of SIXEF-33 ™ /NMP/Propionic Acid Dopes

| Solid Content | Viscosity (poise) at: | | | |
|---|---|---|---|---|
| | 30° C. | 45° C. | 60° C. | 90° C. |
| 41% SIXEF-33 ™ | 3000 | 1100 | 420 | |
| 42% SIXEF-33 ™ | 9600 | 3070 | 1050 | 120 |

EXAMPLE III

Fibers were made using the 42% dope of Example II, a die temperature of 81° C., water as the core solvent, a 25° C. coagulant bath and an air gap of 254 mm or 10 inches.

In the fibers of Table 3, the coagulant was methanol in every case. The first fiber was formed in ambient air with no special treatment, the second in a moist atmosphere, and the third in air with a slight drawing of the fiber as it passed through the air gap. The oxygen permeance and oxygen/nitrogen separation factor were calculated from permeability measurements for each uncoated fiber. Each of these fibers were then coated and the permeance, separation factor and dense layer thickness were calculated for each coated fiber.

The data in Table 3 shows the importance of coating to achieve the desired separation factor. The data also suggests that some improvement in the separation factor may be achieved at the cost of permeance by using moisture or by slightly drawing the fiber.

TABLE 3

| Coating | Condition | $O_2$ Permeance | $\alpha$ | Dense Layer* (Angstroms) |
|---|---|---|---|---|
| no | air | 41 | 1.5 | |
| yes | | 13.5 | 5.5 | 1120 |
| no | moisture | 6.3 | 3.95 | |
| yes | | 4.4 | 6.2 | 3448 |
| no | slight draw | 30 | 1.5 | |
| yes | | 10.5 | 6.3 | 1443 |

$\alpha$ = separation factor: $O_2$ permeability/$N_2$ permeability
Permeance unit: $10^{-6}$ cc (STP) sec cm2 cm Hg
Coating material: 5% Sylgard ™ 184 in petroleum ether. (b.p. = 35–60° C.)
*Calculated data In Table 4, fibers made using water as the coagulant are contrasted against methanol-coagulated fibers. The fibers are produced in air; only the last water-coagulated fiber was drawn. The methanol-coagulated fibers were coated and remeasured. The results show that water coagulation produces a much thicker dense layer, resulting in an unacceptably low permeability.

TABLE 4

| Coating | Coagulant/ Drawing | $O_2$ Permeance | $\alpha$ | Dense layer (Angstroms) |
|---|---|---|---|---|
| yes | | 13.5 | 5.5 | 1120 |
| no | MeOH/none | 41 | 1.5 | |
| yes | | 10.3 | 5.5 | 1480 |
| | | 10.0 | 5.9 | 1525 |
| no | Water/none | 0.9 | 5.0 | 16740 |
| no | Water/yes | 3.9 | 1.0 | |

EXAMPLE IV

In this experiment fiber was prepared using a core solvent containing 80% NMP and 20% water, a moist atmosphere, and a faster fiber spinning speed. The preparation was otherwise identical to that of the first fiber of Table 4. Table 5 compares the characteristics of these two fibers. These results show that the NMP/water core solvent fiber had a higher separation factor and a lower oxygen permeance.

TABLE 5

| Core Solvent | Coating | Condition | Speed (M/min) | $O_2$ permeance | $\alpha$ | Dense Layer* (Angstroms) |
|---|---|---|---|---|---|---|
| Water | no | air | 1.4 | 41 | 1.5 | |
| | yes | | | 13.5 | 5.5 | 1120 |
| NMP/ | no | moisture | 6.8 | 25.1 | 1.4 | |
| $H_2O$ | yes | | | 8.3 | 6.7 | 1834 |

$\alpha$ = separation factor: $O_2$ permeability/$N_2$ permeability
Permeance unit: $10^{-6}$ cc (STP) sec cm2 cm Hg
Coating material: 5% sylgard ™ 184 in petroleum ether.
*Calculated data

EXAMPLE V

The glass transition temperature ($T_g$) of the fiber (initial heating) and the bulk polymer (reheating) were measured for fibers of the present invention and the change in between these quantities was calculated for each fiber. These values were compared to those of polysulfone fibers made using similar solvent systems. These results are presented in Table 6. Unlike polysulfone, the fibers of the present invention have a $T_g$ lower than that of the bulk polymer, suggesting that the fluoropolymer structure is more rigid than that of the polysulfone.

TABLE 6

Glass transition temperature of polysulfone & SIXEF-33 ™ hollow fiber membranes.

| Polymer | Spinning Solvent | $T_g$ (°C.) Initial | $T_g$ (°C.) Reheat | $\Delta T_g$ (°C.) (initial–reheat) |
|---|---|---|---|---|
| Polysulfone | none | 191 | 191 | 0 |
| | PA:NMP | 195 | 190 | +5 |
| SIXEF-33 ™ | None | 247 | 252 | −5 |
| | PA:NMP | 226 | 246 | −20 |

Many variations of the present invention not illustrated herein will occur to those skilled in the art. The present invention is not limited to the embodiments illustrated and described herein, but encompasses all the subject matter within the scope of the appended claims.

We claim:

1. A process for making asymmetric hollow fiber comprising the steps of:
   preparing a dope having a viscosity of at least about 3000 poise at 25° C. by dissolving a fluoropolymer in a solvent consisting essentially of NMP and a second liquid in a ratio in the approximate range of from 90/10 to 40/60;
   spinning said dope through a hollow fiber die while simultaneously passing a core solvent through the center of said die to form a hollow fiber having an outer layer that is denser and less porous than the interior, wherein said outer layer is no more than about one micron thick;
   passing said fiber through an air gap and into a methanol bath;
   removing said fiber from said bath and collecting said fiber; and,
   subsequently coating said fiber with a composition that is highly permeable to gases.

2. A process according to claim wherein said fluoropolymer is a polyimide.

3. A process according to claim 1 wherein said fluoropolymer has a dielectric constant no greater than about 3.0.

4. A process according to claim 1 wherein said second liquid is chosen from the group consisting of acetic acid, propionic acid and butyric acid.

5. A process according to claim 1 wherein said second liquid is propionic acid.

6. A process according to claim 1 wherein said core solvent consists essentially of water and NMP and is from about 20% to about 100% water by weight.

7. A process according to claim 1 wherein said core solvent is acetic acid, propionic acid, glycerine, or mixtures thereof.

8. A process according to claim 1 wherein said air gap is no greater than about ten inches.

9. A process according to claim 8 wherein said air gap is about 5-10 inches.

10. A process according to claim 1 wherein said coating is approximately 1-8 microns thick.

11. A process according to claim wherein said coating composition comprises silicone.

12. A process according to claim 1 wherein said dense outer layer of said fiber has a thickness in the approximate range of 0.05-0.3 micron.

13. A process for making asymmetric hollow fiber for gas separations, said fiber having an oxygen/nitrogen separation factor of at least about five, comprising the steps of:

preparing a dope having a viscosity of at least about 3000 poise at 25° C. by dissolving a fluoropolymer in a solvent consisting essentially of NMP and propionic acid in a ratio in the approximate range of from 90/10 to 40/60;

preparing a core solvent consisting essentially of water and NMP wherein said core solvent is from about 20% to about 100% water by weight;

spinning said dope through a hollow fiber die at a temperature of approximately 25°-100° C. while simultaneously passing said core solvent through the center of said die to form a hollow fiber having an outer layer that is denser and less porous than the interior, wherein said outer layer is no more than about one micron thick;

passing said fiber through an air gap no greater than ten inches and into a methanol bath, said bath being at a temperature of about 25° C.;

removing said fiber from said bath and collecting said fiber; and, subsequently coating said fiber with a silicone-containing composition that is highly permeable to gases to a coating thickness of about 3-8 microns.

* * * * *